(12) United States Patent
Katayama et al.

(10) Patent No.: US 9,399,706 B2
(45) Date of Patent: Jul. 26, 2016

(54) URETHANE FOAM MOLDED PRODUCT AND METHOD FOR PRODUCING THE SAME

(71) Applicant: TOKAI RUBBER INDUSTRIES, LTD., Komaki-shi, Aichi-ken (JP)

(72) Inventors: Naoki Katayama, Nagoya (JP); Koji Tomiyama, Ichinomiya (JP); Yasuo Suzuki, Komaki (JP)

(73) Assignee: SUMITOMO RIKO COMPANY LIMITED, Aichi (JP)

( * ) Notice: Subject to any disclaimer, the term of this patent is extended or adjusted under 35 U.S.C. 154(b) by 257 days.

(21) Appl. No.: 14/044,157

(22) Filed: Oct. 2, 2013

(65) Prior Publication Data

US 2014/0039076 A1 Feb. 6, 2014

Related U.S. Application Data

(63) Continuation of application No. PCT/JP2012/073505, filed on Sep. 13, 2012.

(30) Foreign Application Priority Data

Sep. 20, 2011 (JP) .................. 2011-204450

(51) Int. Cl.
| | |
|---|---|
| *C08J 9/04* | (2006.01) |
| *C08J 9/00* | (2006.01) |
| *C08G 18/48* | (2006.01) |
| *C08G 18/66* | (2006.01) |
| *C08G 18/76* | (2006.01) |
| *B29C 44/34* | (2006.01) |
| *C08K 9/08* | (2006.01) |
| *C08G 101/00* | (2006.01) |

(52) U.S. Cl.
CPC ........... *C08J 9/0066* (2013.01); *B29C 44/3403* (2013.01); *C08G 18/4829* (2013.01); *C08G 18/6674* (2013.01); *C08G 18/7671* (2013.01); *C08J 9/0061* (2013.01); *C08K 9/08* (2013.01); *B29K 2995/0008* (2013.01); *C08G 2101/0083* (2013.01); *C08J 2201/026* (2013.01); *C08J 2375/04* (2013.01); *C08J 2375/08* (2013.01); *C08J 2401/08* (2013.01); *C08J 2429/04* (2013.01)

(58) Field of Classification Search
CPC .................. B29C 44/3403; B29K 2995/0008; C08G 18/4829; C08G 18/6674; C08G 18/7671; C08G 2101/0083; C08J 9/0061; C08J 9/0066; C08J 2201/026; C08J 2375/08; C08J 2375/04; C08J 2401/08; C08J 2429/04; C08K 9/08; C08L 75/08
See application file for complete search history.

(56) References Cited

U.S. PATENT DOCUMENTS

| 6,517,744 | B1 | 2/2003 | Hara et al. | |
| 9,034,935 | B2* | 5/2015 | Tomiyama | C08G 18/3206 521/123 |
| 2007/0232498 | A1 | 10/2007 | Uchida et al. | |
| 2009/0057603 | A1* | 3/2009 | Tomiyama | B29C 44/12 252/62.54 |
| 2013/0001460 | A1* | 1/2013 | Tomiyama | C08G 18/3206 252/62 |

FOREIGN PATENT DOCUMENTS

| JP | 04-343207 A | 11/1992 |
| JP | 2001-274302 A | 10/2001 |
| JP | 2001-284859 A | 10/2001 |
| JP | 2001-315244 A | 11/2001 |
| JP | 2001-335602 A | 12/2001 |
| JP | 2003-321554 A | 11/2003 |
| JP | 2006-219562 A | 8/2006 |
| JP | 2007-230544 A | 9/2007 |
| JP | 2007-269924 A | 10/2007 |
| JP | 2009-051148 A | 3/2009 |
| WO | 2011/122441 A1 | 10/2011 |

OTHER PUBLICATIONS

Extended European Search Report dated Sep. 29, 2015 issued in counterpart European patent application No. 12833923.1, (5 pages).
Extended European Search Report dated Dec. 12, 2014, issued in corresponding EP Patent Application No. 128339231 (8 pages).
English translation of International Preliminary Report on Patentability (Form PCT/IB/373) of International Application No. PCT/JP2012/073505 dated Mar. 25, 2014 with Form PCT/ISA/237 mailed Dec. 18, 2012 (4 pages).
International Search Report for PCT/JP2012/073505, Mailing Date of Dec. 18, 2012.

* cited by examiner

*Primary Examiner* — John Cooney
(74) *Attorney, Agent, or Firm* — Westerman, Hattori, Daniels & Adrian, LLP

(57) ABSTRACT

To provide a urethane foam molded product having high thermal conductivity and electric insulation and a method for producing the same. A urethane foam molded product includes a base material made of a polyurethane foam and composite particles that are blended in the base material and oriented in a mutually connected state, in which each of the composite particles includes a thermally conductive particle made of a non-magnetic body, and a magnetic particle and an insulating inorganic particle that are adhered to the surface of the thermally conductive particle through a binder. A powder of the composite particles can be produced by stirring a powder raw material containing a powder of the thermally conductive particle, a powder of the magnetic particle, a powder of the insulating inorganic particle, and the binder using a stirring granulator.

13 Claims, 3 Drawing Sheets

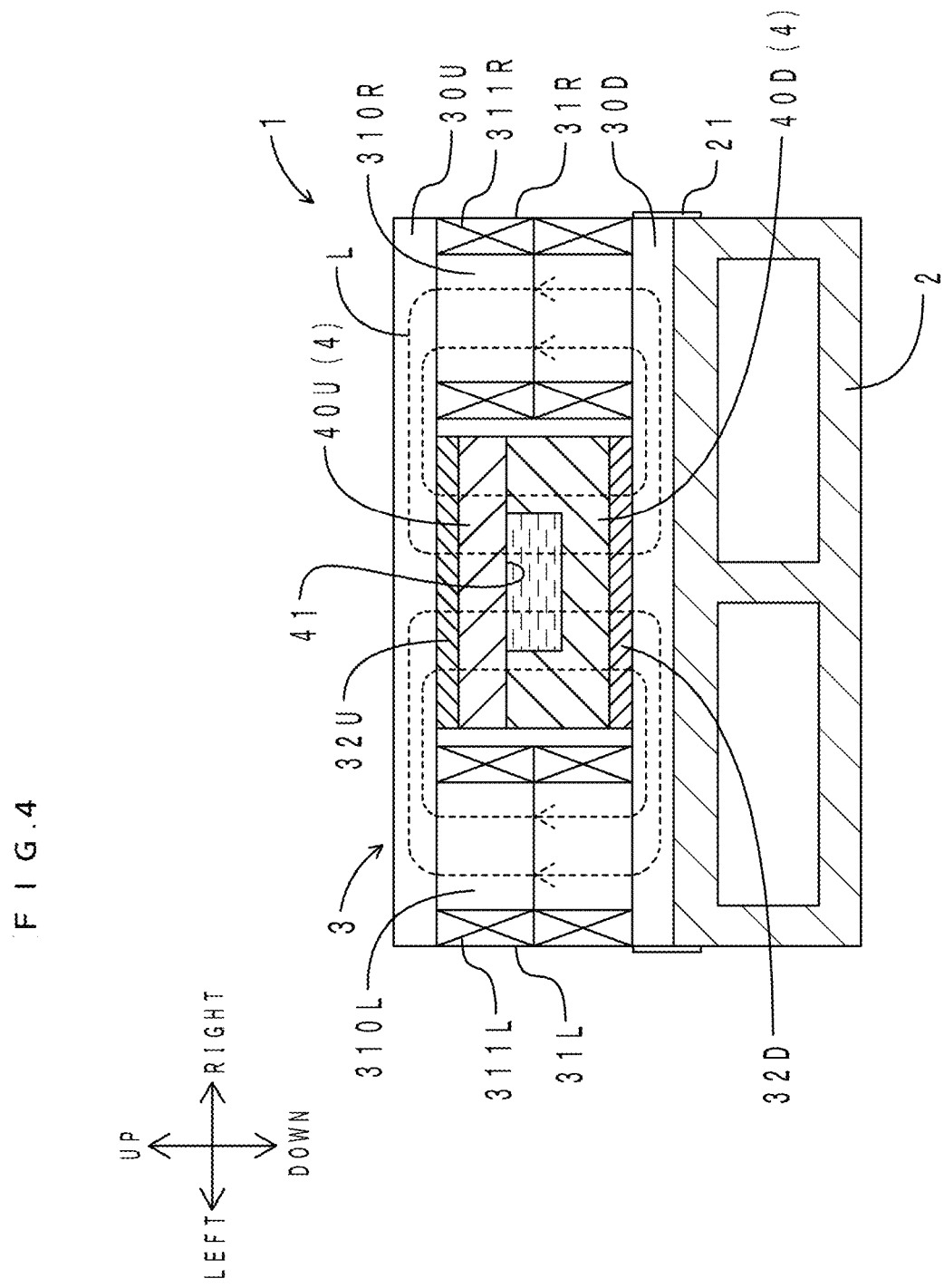

URETHANE FOAM MOLDED PRODUCT AND METHOD FOR PRODUCING THE SAME

TECHNICAL FIELD

The present invention relates to a urethane foam molded product having high thermal conductivity and electric insulation, and a method for producing the same.

BACKGROUND ART

A urethane foam molded product is used as a sound absorbing material or a vibration absorbing material in various fields such as automobile and electronic equipment. The urethane foam molded product has a large number of cells (bubbles) therein. Therefore, a usual urethane foam molded product has a small thermal conductivity and poor heat dissipation. Accordingly when such a urethane foam molded product is arranged around an engine, a motor, and the like accompanied by heat generation, heat is accumulated in the urethane foam molded product, which may disadvantageously cause an elevation of the temperature. For solving such an issue, for example, Patent Documents 1 and 2 disclose urethane foam molded products of which heat dissipation is enhanced by blending magnetic particles in a polyurethane foam.

RELATED ART DOCUMENTS

Patent Documents

Patent Document 1: Japanese Patent Application Publication No. 2007-230544 (JP 2007-230544 A)
Patent Document 2: Japanese Patent Application Publication No. 2009-51148 (JP 2009-51148 A)
Patent Document 3: Japanese Patent Application Publication No. 2003-321554 (JP 2003-321554 A)
Patent Document 4: Japanese Patent Application Publication No. 2006-219562, (JP 2006-219562 A)

SUMMARY OF THE INVENTION

Problem to be Solved by the Invention

When magnetic particles are oriented in a mutually connected state in a polyurethane foam as the urethane foam molded products in Patent Documents 1 and 2, a transfer path of heat is formed along an orientation direction of the magnetic particles. Herewith, heat dissipation of the urethane foam molded product is enhanced. Thermal conductivity of iron or stainless steel blended as the magnetic particles is not very high. Accordingly, only by orientation of magnetic particles, an effect of enhancing heat dissipation is not satisfactory.

On the other hand, in order to enhance heat dissipation, it is also considered to blend in a polyurethane foam particles having a large thermal conductivity such as graphite. However, only by blending graphite, it is difficult to bring graphite into contact with each other to form a transfer path of heat. For example, when a large amount of graphite is blended in order to form a transfer path of heat, the foam molding may be affected or the physical properties such as sound absorbing characteristics of the polyurethane foam may decrease. Disadvantages such as an increase in the mass of the urethane foam molded product and an increase in the cost may also arise.

The above-described magnetic particles or the above-described graphite has high electric conductivity. Therefore, when the magnetic particles or graphite is blended in the polyurethane foam, a conduction path is formed in the polyurethane foam by the contact of the magnetic particles or graphite. Therefore, in the urethane foam molded product, electric insulation is difficult to be maintained. Accordingly, even when a urethane foam molded product has high heat dissipation, the urethane foam molded product cannot be used in an application requiring electric insulation such as a heat radiating member in electric equipment.

The present invention has been devised in light of such a situation, and it is an object of the present invention to provide a urethane foam molded product having high thermal conductivity and electric insulation. It is also an object of the present invention to provide a method for producing the urethane foam molded product.

Means for Solving the Problem (1) In order to attain the above objects, the urethane foam molded product of the present invention is characterized by including: a base material made of a polyurethane foam; and composite particles that are blended in the base material and oriented in a mutually connected state, in which each of the composite particles includes a thermally conductive particle made of a non-magnetic body, and a magnetic particle and an insulating inorganic particle that are adhered to a surface of the thermally conductive particle through a binder.

The thermally conductive particles forming cores of the composite particles have a large thermal conductivity. The thermally conductive particles themselves are non-magnetic bodies. However, the magnetic particles are adhered to the surfaces of the thermally conductive particles. The magnetic particles are oriented along magnetic lines of force in a magnetic field. Therefore, when a magnetic field is caused to act on the composite particles, the composite particles are oriented along magnetic lines of force. That is, by compounding the thermally conductive particles with the magnetic particles, the thermally conductive particles made of a non-magnetic body can be oriented using a magnetic field orientation of the magnetic particles. The magnetic particles may be adhered to the surfaces of the thermally conductive particles either directly or indirectly through the insulating inorganic particles, that is, may be adhered to the surfaces of the insulating inorganic particles that are adhered to the thermally conductive particles.

The oriented composite particles are placed in the base material in a mutually connected state. The beaded composite particles form a transfer path of heat in the base material. Herewith, heat applied to one end of the urethane foam molded product of the present invention is transferred to the other end of the urethane foam molded product in the orientation direction through the composite particles and is rapidly discharged. Therefore, the urethane foam molded product of the present invention is excellent in thermal conductivity. Accordingly, even when the urethane foam molded product of the present invention is arranged near parts accompanied by heat generation, heat is effectively radiated through the urethane foam molded product, so that an elevation of the temperature can be suppressed. In comparison with the case where only the magnetic particles are oriented, higher thermal conductivity can be achieved with a smaller amount of the composite particles. The smaller the blending amount of the composite particles is, the smaller the influence on physical properties such as tensile strength, elongation, and sound absorbing characteristics of the urethane foam molded product is. Also, reduction in weight and cost of the urethane foam molded product become possible.

In the urethane foam molded product of the present invention, the composite particles in the base material may be arranged with a certain regularity in a predetermined direction. For example, the composite particles may be arranged between one end and the other end (the other end may not be opposite to the one end at 180°) of the urethane foam molded product either in a straight line shape or a curved shape, or may be arranged radially from the center toward a circumference in the urethane foam molded product.

In addition to the magnetic particles, the insulating inorganic particles are adhered to the surfaces of the thermally conductive particles. The insulating inorganic particles may be adhered to the surfaces of the thermally conductive particles either directly or indirectly through the magnetic particles, that is, may be adhered to the surfaces of the magnetic particles that are adhered to the thermally conductive particles. As described below, a carbon material or a metal is preferred as the thermally conductive particles. As the magnetic particles, a ferromagnetic body such as stainless steel is preferred. Therefore, particles prepared by adhering the magnetic particles to the surfaces of the thermally conductive particles have high electric conductivity. However, when the insulating inorganic particles are further adhered to the surfaces of the thermally conductive particles, even when the composite particles are oriented in a mutually contacted state, the thermally conductive particles or the magnetic particles (electrically conductive particles) are less likely to contact each other between the adjacent composite particles. Accordingly, electric resistance between the composite particles increases. By bringing the composite particles into contact with each other through the insulating inorganic particles, the electric conduction between the composite particles can be cut. Herewith, in the urethane foam molded product of the present invention, electric insulation can be achieved. Thus, the urethane foam molded product of the present invention has both high thermal conductivity and electric insulation. Accordingly, the urethane foam molded product of the present invention can also be used in an application requiring both heat dissipation and electric insulation such as a heat radiating member in electronic equipment.

In the composite particles, the magnetic particles and the insulating inorganic particle are adhered to the thermally conductive particles through a binder. By using the binder, the magnetic particles and the insulating inorganic particles can be softly adhered to the surfaces of the thermally conductive particles. Therefore, even when the thermally conductive particles have a shape having high thermal conductivity (shape having a large aspect ratio), the magnetic particles and the insulating inorganic particles can be compounded with the thermally conductive particles without deforming the thermally conductive particles. Furthermore, the use of the binder can increase the amounts of the adhered magnetic particles and the adhered insulating inorganic particles. By adhering a large amount of magnetic particles, a desired orientation state of the composite particles can be achieved even in a low magnetic field with a magnetic flux density of 350 mT or less. As described below, for forming the magnetic field, an electromagnet is used, for example. When the foam molding can be performed in a low magnetic field, a gap between electromagnets that are arranged so as to sandwich the foaming mold can be increased. Therefore, a cavity of the foaming mold can be enlarged, so that the degree of freedom in the shape of the product becomes high. Furthermore, the facility cost and the running cost of the electromagnets can be reduced.

On the other hand, Patent Document 3 states that adhering a powder of a ferromagnetic body to the surface of a graphite powder can promote the orientation of the graphite powder. Examples of a method for mechanically fixing particles include a mechanochemical method. However, adhering using the binder is not disclosed therein. For example, when the magnetic particles are adhered to the surfaces of the thermally conductive particles without using the binder, it is difficult to increase the amount of the adhered magnetic particles. That is, in particles prepared by compounding without using the binder, the amount of the adhered magnetic particles is small, so that magnetism necessary for orientation of the composite particles is insufficient. Therefore, when such particles are used, a desired orientation state cannot be achieved in a low magnetic field. Graphite is brittle, so that when particles are subjected to a mechanochemical treatment accompanied by compression and shearing of the particles, the particles are easily crashed and cannot maintain the shape thereof.

(2) A method for producing the urethane foam molded product of the present invention is a method for producing the urethane foam molded product in the case where the composite particles are produced by a stirring granulation method. The method is characterized by including: a composite particle producing process of stirring a powder raw material containing a powder of the thermally conductive particle, a powder of the magnetic particle, a powder of the insulating inorganic particle, and the binder using a stirring granulator to produce a powder of the composite particles; a raw material mixing process of mixing the produced powder of the composite particles, a foamable urethane resin raw material, and as necessary, the powder of the insulating inorganic particle to prepare a mixed raw material; and a foam molding process of injecting the mixed raw material into a cavity of a foaming mold and performing foam molding with applying a magnetic field to the mixed raw material so that the magnetic flux density in the cavity is substantially homogeneous.

First, in the composite particle producing process, the powder raw material containing the powder of the thermally conductive particles, the powder of the magnetic particles, the powder of the insulating inorganic particles, and the binder for adhering these particles, is stirred at high speed. Herewith, the powder of the composite particles can be easily produced. By the stiffing granulation method, the magnetic particles and the insulating inorganic particles can be softly adhered to the thermally conductive particles through the binder. Accordingly the above particles can be compounded without deformation. By using the binder, the amounts of the adhered magnetic particles and the adhered insulating inorganic particles can be increased. By adhering a large amount of magnetic particles, a desired orientation state of the composite particles can be achieved in a low magnetic field in a foam molding process below.

For example, by coating the surfaces of the thermally conductive particles and the like with an insulating resin or the like, the conduction between the composite particles can be cut. However, for securing electric insulation withstanding a high voltage, it is necessary to increase the film thickness of the resin. In this case, it is difficult to coat particles one by one without aggregation of the particles. In this respect, according to the production method of the present invention, the insulating inorganic particles are adhered to the thermally conductive particles by a stiffing granulation method. Accordingly, the insulating inorganic particles can be reliably adhered to each of the thermally conductive particles. Furthermore, with a particle diameter of the insulating inorganic particles to be adhered, electric insulation between the composite particles can be easily controlled.

By the stirring granulation method, the adhering of the magnetic particles and the adhering of the insulating inorganic particles can be simultaneously performed, or the magnetic particles are adhered and then, the adhering of the insulating inorganic particles can be successively performed. Therefore, the composite particles can be produced efficiently and at low cost.

Next, in the raw material mixing process, the produced powder of the composite particles is mixed with the foamable urethane resin raw material and if necessary, the powder of the insulating inorganic particles. A mode in which the powder of the insulating inorganic particles itself is blended besides the powder of the composite particles is described in detail in Modes for Carrying out the Invention below. Then, in the foam molding process, the mixed raw material is foam molded in a magnetic field. Here, by rendering the magnetic flux density in the cavity substantially homogeneous, uneven distribution of the composite particles due to a variation of the magnetic flux density can be suppressed. Therefore, even when the blending amount of the composite particles is relatively small, the composite particles can be oriented while being dispersed in the whole base material. Thus, according to the production method of the present invention, with a relatively small amount of the composite particles blended, the urethane foam molded product of the present invention having high thermal conductivity and electric insulation can be easily produced.

BRIEF DESCRIPTION OF THE DRAWINGS

FIG. 4 is a sectional view of the magnetic-induced foam molding apparatus.

DESCRIPTION OF THE REFERENCE NUMERALS

Figure 1:
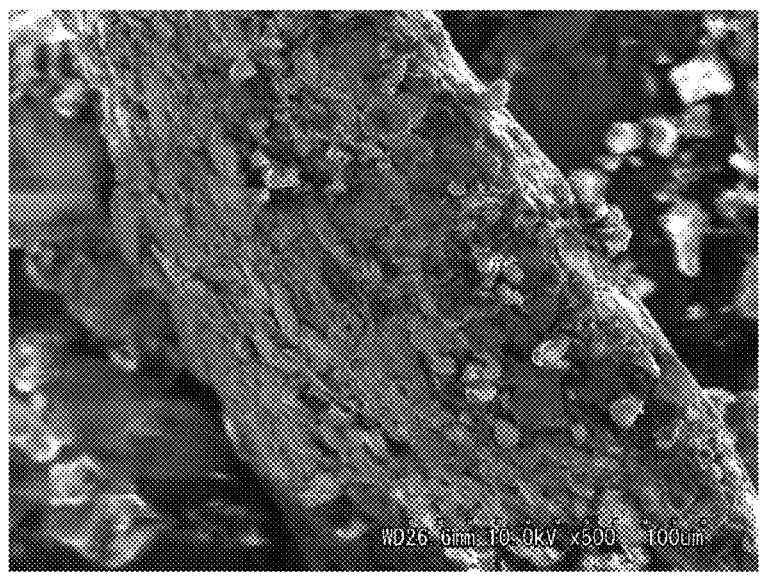
FIG. 1 is an SEM photograph of a composite particle of Example 2 (magnification: 500 times).

1: Magnetic-induced foam molding apparatus, 2: Frame, 21: Bracket, 3: Electromagnet part, 30D, 30U: Yoke part, 31L, 31R: Coil part, 32D, 32U: Pole piece, 310L, 310R: Core part, 311L, 311R: Conductor, 4: Foaming mold, 40U: Upper mold, 40D: Lower mold, 41: Cavity, L: Magnetic lines of force Modes For Carrying Out The Invention Hereinafter, embodiments of the urethane foam molded product and a method for producing the same according to the present invention are described. Note that the urethane foam molded product and the method fix producing the same of the present invention are not limited to the embodiments below, and can be embodied in various modes in which alteration, improvement, and the like that a person skilled in the art can make have been made without departing from the scope of the present invention.

<Urethane Foam Molded Product>

The urethane foam molded product of the present invention has a base material made of a polyurethane foam and composite particles blended in the base material and oriented in a mutually connected state.

The polyurethane foam is produced from a foamable urethane resin raw material such as a polyisocyanate component and a polyol component. The detail thereof will be described in the section of a method for producing the urethane foam molded product of the present invention below.

The composite particles include thermally conductive particles made of a non-magnetic body, and magnetic particles and insulating inorganic particles that are adhered to the surfaces of the thermally conductive particles through the binder.

The thermally conductive particles may be a non-magnetic body having a large thermal conductivity. In the present specification, a diamagnetic body and a paramagnetic body other than a ferromagnetic body or an antiferromagnetic body are called non-magnetic bodies. For example, the thermally conductive particles preferably have a thermal conductivity of 200 W/m·K or more. As the material for the thermally conductive particles, for example, a carbon material such as graphite and a carbon fiber is preferred. The material may also be aluminum, gold, silver, copper, or an alloy containing these metals as a base metal. As the thermally conductive particles, particles of one type may be used or particles of two or more types may be used in combination.

The shape of the thermally conductive particles is not particularly limited so long as the thermally conductive particles can be compounded with the magnetic particles and the insulating inorganic particles. For example, various shapes such as a flake shape, a fiber shape, a columnar shape, a spherical shape, an oval spherical shape, and an elongated spherical shape (a shape formed by linking a pair of opposing hemispheres with a column) can be adopted. When the thermally conductive particles have a shape other than a spherical shape, a contact area between the composite particles becomes large. Accordingly, the transfer path of heat can be more easily secured and a large amount of heat can be transferred. Usually the shape of metal particles such as aluminum, gold, and copper is spherical. On the other hand, graphite particles having a large aspect ratio can be inexpensively obtained in comparison with metal particles. Therefore, as the material for the thermally conductive particles, graphite is preferred.

Examples of the graphite include a natural graphite such as a flake graphite, a scaly graphite, and an earthy graphite and an artificial graphite. An artificial graphite is not easily formed into a flake shape. Thus, because having a flake shape and a high effect of increasing thermal conductivity a natural graphite is preferred. As the graphite, there may be used an expanded graphite produced by inserting between layers of a flake graphite a substance generating a gas by being heated. The expanded graphite is used, for example, as a flame retardant as disclosed in Patent Document 4. When the expanded graphite is heated, gaps between the layers are widened by a generated gas, and layers that are stable relative to heat or chemicals is formed. The formed layers act as an insulating layer and inhibit transfer of heat, so that a flame retarding effect is produced. Therefore, it is preferred that as the thermally conductive particles, at least one of natural graphite particles and expanded graphite particles are used.

Usually the urethane foam molded product to which flame retardance is imparted has a dropping effect to suppress the spread of fire by causing the source of fire to drop off even when exposed to fire. However, when the magnetic particles are blended in the urethane foam molded product, the dropping effect may be impaired and a self-extinguishing property of the urethane foam molded product may lower. In the urethane foam molded product of the present invention, the composite particles are oriented. Therefore, heat applied to the urethane foam molded product is easily transferred to the thermally conductive particles. Therefore, when the thermally conductive particles include the expanded graphite, the temperature of the expanded graphite promptly reaches an expansion initiation temperature. Herewith, a flame retarding effect by the expanded graphite is rapidly exhibited. Accordingly, by using the expanded graphite as the thermally conductive particles, the lowering of self-extinguishing property of the urethane foam molded product can be suppressed and flame retardance thereof can be maintained.

When the expanded graphite is used as the thermally conductive particles, a preferred expanded graphite may be selected from publicly known expanded graphite powders by considering the expansion initiation temperature, the expansion rate, and the like. For example, the expansion initiation temperature of the expanded graphite should be higher than a temperature for heat generation during the molding of the urethane foam molded product. Specifically an expanded graphite having an expansion initiation temperature of 150° C. or more is preferred.

For enhancing flame retardance of the urethane foam molded product, it is desired to set the blending amount of the expanded graphite to 5% by mass or more when the mass of the whole urethane foam molded product is assumed to 100% by mass.

The size of the thermally conductive particles may be determined by considering dispersibility thereof, an apparatus used for the foam molding, and the like. For example, the thermally conductive particles have an average particle diameter of preferably 500 µm or less and more preferably 300 µm or less. In the present specification, the length of the longest part of the particle is adopted as the particle diameter.

The magnetic particles may be magnetic particles excellent in magnetization characteristic, and preferred examples thereof include particles of: a ferromagnetic body such as iron, nickel, cobalt, gadolinium, stainless steel, magnetite, maghemite, manganese zinc ferrite, barium ferrite, and strontium ferrite; an antiferromagnetic body such as MnO, $Cr_2O_3$, $FeCl_2$, and MnAs; and alloys using these substances. Among them, from the viewpoints of ease of obtaining as fine particles and high saturation magnetization, preferred are powders of iron, nickel, cobalt, and an iron-based alloy of these metals (including stainless steel).

The magnetic particles are adhered to the surfaces of the thermally conductive particles and cause the thermally conductive particles to be oriented. The magnetic particles may be adhered to the surfaces of the thermally conductive particles either directly or indirectly through the insulating inorganic particles. The magnetic particles may be adhered to only parts of the surfaces of the thermally conductive particles or adhered so as to cover the whole surfaces thereof. The size of the magnetic particles may be accordingly determined by considering the size of the thermally conductive particles, orientation property of the composite particles, thermal conductivity between the composite particles, and the like. For example, the magnetic particles has a particle diameter of desirably 1/20 or more and 1/10 or less of the particle diameter of the thermally conductive particles. The smaller the size of the magnetic particles is, the lower the saturation magnetization of the magnetic particles tends to be. Accordingly, for orientation of the composite particles with a smaller amount of the magnetic particles, the magnetic particled need to have an average particle diameter of 100 nm or more. The magnetic particles have more preferably an average particle diameter of 1 µm or more and further preferably 5 µm or more.

The shape of the magnetic particles is not particularly limited. For example, when the shape of the magnetic particles is flat, the distance between the adjacent thermally conductive particles is smaller in comparison with a case of a spherical shape. Herewith, thermal conductivity between the adjacent composite particles increases. As a result thereof thermal conductivity of the urethane foam molded product increases. When the shape of the magnetic particles is flat, the magnetic particles and the thermally conductive particles are in surface contact. That is, the contact area of the magnetic particles and the thermally conductive particles increases. Herewith, an adhesive force between the magnetic particles and the thermally conductive particles is enhanced. Consequently, the magnetic particles doe not easily peel off. In addition, thermal conductivity between the magnetic particles and the thermally conductive particles increases. Based on the reasons given above, flake-Shaped particles are desirably adopted as the magnetic particles.

In the case where graphite is adopted as the thermally conductive particles, when considering orientation property of the composite particles and an effect of enhancing thermal conductivity, a volume ratio between the graphite particles and the magnetic particles in the composite particles is desirably 7:3 to 5:5. When the volume ratio of the magnetic particles is less than 30%, magnetism may be insufficient for orientation of the composite particles. When the volume ratio of the graphite particles is less than 50%, an effect of increasing thermal conductivity decreases.

The insulating inorganic particles may be particles of an inorganic material having insulation. Particularly from the viewpoint of not inhibiting thermal conductivity between the composite particles, the insulating inorganic particles desirably have a relatively large thermal conductivity. For example, the insulating inorganic particles preferably have a thermal conductivity of 5 W/m·K or more. Examples of the insulating inorganic material having a thermal conductivity of 5 W/m·K or more include aluminum hydroxide, aluminum oxide (alumina), magnesium hydroxide, magnesium oxide, and talc. For suppressing the lowering of the self-extinguishing property of the urethane foam molded product to maintain flame retardance of the urethane foam molded product, it is preferred that the insulating inorganic particles have flame retardance. For example, aluminum hydroxide has a relatively large thermal conductivity and flame retardance and thus is preferred. When aluminum hydroxide is heated to a certain temperature, it is dehydrated and decomposed. Dehydration-decomposition is an endothermic reaction, so that an elevation of the temperature is suppressed and a flame retarding effect is realized.

The insulating inorganic particles may be adhered to the surfaces of the thermally conductive particles either directly or indirectly through the magnetic particles. The insulating inorganic particles may be adhered to only parts of the surfaces of the thermally conductive particles or adhered so as to cover the whole surfaces. From the viewpoint of increasing an electric resistance between the composite particles to enhance electric insulation of the urethane foam molded product, the insulating inorganic particles are desirably located in the outermost layers of the composite particles.

The size of the insulating inorganic particles may be accordingly determined by considering adhesion thereof to the thermally conductive particles and the magnetic particles, and electric insulation and thermal conductivity between the composite particles. When the insulating inorganic, particles are too large, adhesion and thermal conductivity between the composite particles decrease. For example, the insulating inorganic particles desirably have a particle diameter of 1/100 or more and 1/10 or less of the particle diameter of the thermally conductive particles.

The shape of the insulating inorganic particles is not particularly limited. For example, when the shape of the insulating inorganic particles is flat, the distance between the adjacent thermally conductive particles is smaller in comparison with the case of a spherical shape. Herewith, thermal conductivity between the adjacent composite particles increases. As the result thereof, thermal conductivity of the urethane foam molded product increases. A contact area of the insulating inorganic particles with the magnetic particles and the thermally conductive particles increases. Herewith, the adhesive force is enhanced and the insulating inorganic particles do not easily peel off. In addition, thermal conductivity between the insulating inorganic particles, and the magnetic particles and the thermally conductive particles also increases. Based on the reasons given above, flake-shaped particles are desirably adopted as the insulating inorganic particles.

For satisfying both electric insulation and thermal conductivity in the urethane foam molded product, a volume ratio between the thermally conductive particles and the insulating inorganic particles in the composite particles is desirably 4:6 to 3:7. When the volume ratio of the insulating inorganic particles is less than 60%, electric insulation of the urethane foam molded product may not be achieved. On the other hand, when the volume ratio of the insulating inorganic particles is more than 70%, an effect of increasing thermal conductivity of the urethane foam molded product decreases.

The binder for adhering the magnetic particles and the insulating inorganic particles to the thermally conductive particles may be accordingly selected by considering the type of the thermally conductive particles and the like, the influence on the foam molding, and the like. For reasons of having a small influence on the foam molding and being friendly for the environment, a water-soluble binder is preferred. Examples of the water-soluble binder include methylcellulose, carboxymethylcellulose, hydroxypropylmethylcellulose, and polyvinyl alcohol. The binder for adhering the magnetic particles and the binder for adhering the insulating inorganic particles may be the same as or different from each other.

The composite particles are produced by adhering the magnetic particles and the insulating inorganic particles to the thermally conductive particles through the binder. For example, the composite particles can be produced by spraying to the powder of the thermally conductive particles a paint prepared by dispersing the powder of the thermally conductive particles, the powder of the magnetic particles, and the powder of the insulating inorganic particles in a solution in which the binder is dissolved. The composite particles can also be produced by stirring at high speed, the powder raw material containing the powder of the thermally conductive particles, the powder of the magnetic particles, the powder of the insulating inorganic particles, and the binder (stirring granulation method). In the stirring granulation method, friction heat is generated by stirring with high speed. Therefore, the binder is desirably a binder not having volatility. For example, the above-described water-soluble binder is preferred.

The blending amount of the composite particles in the urethane foam molded product may be determined by considering an influence on the foaming reaction, an effect of increasing thermal conductivity, and the like. For example, for obtaining a urethane foam molded product having desired physical properties without inhibiting the foaming reaction, the blending amount of the composite particles is preferably 20% by volume or less when the volume of the urethane foam molded product is assumed to be 100% by volume. The blending amount of the composite particles is more preferably 15% by volume or less. On the other hand, for obtaining an effect of increasing thermal conductivity, the blending amount of the composite particles is preferably 3% by volume or more and more preferably 10% by volume or more.

The urethane foam molded product of the present invention may further have the insulating inorganic particles dispersed in the base material. That is in the base material, besides the oriented composite particles, the insulating inorganic particles may be dispersed. The insulating inorganic particles dispersed individually in the base material are particles of the above-described inorganic material having insulation. When the insulating inorganic particles are dispersed in the base material, the insulating inorganic particle enters between the composite particles, so that the composite particles have difficulty in being conducted with each other. Accordingly, insulation of the urethane foam molded product is further enhanced. When the insulating inorganic particles have a relatively large thermal conductivity, the transfer path of heat is formed by the insulating inorganic particles besides the transfer path of heat formed by the composite particles. Herewith, heat dissipation of the urethane foam molded product is further enhanced. When the insulating inorganic particles have flame retardance, the amount of the flame retardant in the whole urethane foam molded product increases. Accordingly, flame retardance of the urethane foam molded product is further enhanced.

Insulating inorganic particles dispersed in the base material may be the same as or different from insulating inorganic particles constituting the composite particles. The insulating inorganic particles dispersed in the base material may be either of one type or of two or more types. Although it is described repeatedly, the insulating inorganic particles dispersed in the base material desirably have a relatively large thermal conductivity. Preferred examples thereof include aluminum hydroxide, aluminum oxide (alumina), magnesium hydroxide, magnesium oxide, and talc. Among them, aluminum hydroxide having a relatively large thermal conductivity and flame retardance is preferred.

The shape of the insulating inorganic particles dispersed in the base material is not particularly limited and may be either a spherical shape or a flake shape. Although the size of the insulating inorganic particles dispersed in the base material is not particularly limited, for example, a median diameter thereof is desirably 1 μm or more and 20 μm or less. When the blending amount of the insulating inorganic particles is fixed, the smaller the particle diameter is, the larger the surface area is. Therefore, when the median diameter is less than 1 μm, a viscosity of the mixed raw material (foamable urethane resin raw material+composite particles+insulating inorganic particles) increases, so that the molding becomes difficult during the production of the urethane foam molded product. On the contrary, when the median diameter is more than 20 μm, an effect of increasing thermal conductivity decreases.

The blending amount of the insulating inorganic particles dispersed in the base material is preferably 20% by volume or less when the volume of the urethane foam molded product is assumed to be 100% by volume, considering the ease of molding. The blending amount thereof is more preferably 15% by volume or less. For obtaining an effect of increasing thermal conductivity, the blending amount thereof is preferably 5% by volume or more and more preferably 8% by volume or more.

From the viewpoint of achieving high thermal conductivity, the urethane foam molded product of the present invention desirably has a thermal conductivity of 1 W/m·K or more. The thermal conductivity may be measured according to the heat flow meter method of JIS A1412-2 (1999). From the viewpoint of achieving electric insulation, the urethane foam molded product of the present invention desirably has a volume resistivity of $10^8$ Ω·cm or more during application of a voltage of 1 kV. The measurement of the volume resistivity may be performed according to the parallel terminal electrode method of JIS K6271 (2008).

<Method for Producing Urethane Foam Molded Product>

The method for producing the urethane foam molded product of the present invention is a production method in the case where the composite particles are produced by the stirring granulation method, and includes a composite particle producing process, a raw material mixing process, and a foam molding process. Hereinafter, each process will be described.

(1) Composite Particle Producing Process

The present process is a process for stirring the powder raw material containing the powder of the thermally conductive particles, the powder of the magnetic particles, the powder of the insulating inorganic particles, and the binder using a stifling granulator and producing the powder of the composite particles.

The thermally conductive particles, the magnetic particles, the insulating inorganic particles, and the binder have been described above. Therefore, the description thereof is omitted here. The blending amount of the powder of the thermally conductive particles, the powder of the magnetic particles, the powder of the insulating inorganic particles, and the binder may also be accordingly controlled by considering the orientation property of the produced composite particles in a magnetic field, and electric insulation, thermal conductivity, and the like of the urethane foam molded product when the magnetic particles are blended in the urethane foam molded product.

For example, when graphite is adopted as the thermally conductive particles, the blending amount of the powder of the insulating inorganic particles is desirably 150 parts by mass or more and 250 parts by mass or less relative to 100 parts by mass of the powder of the thermally conductive particles (graphite powder). When the blending amount of the powder of the insulating inorganic particles is less than 150 parts by mass, the amount of the adhered insulating inorganic particles is small, so that cutting of conduction between the composite particles becomes insufficient. Therefore, electric insulation of the urethane foam molded product may not be achieved. On the other hand, when the blending amount of the powder of the insulating inorganic particles is more than 250 parts by mass, the amount of the adhered insulating inorganic particles increases, so that thermal conductivity between the composite particles lowers. Herewith, thermal conductivity of the urethane foam molded product lowers. The blending amount of the powder of the magnetic particles is desirably 100 parts by mass or more and 200 parts by mass or less relative to 100 parts by mass of the graphite powder. When the blending amount of the powder of the magnetic particles is less than 100 parts by mass, the amount of the adhered magnetic particles is small, so that magnetism may be insufficient for orientation of the composite particles. On the other hand, when the blending amount of the powder of the magnetic particles is more than 200 parts by mass, the amount of the adhered magnetic particles becomes excessive, so the mass of the urethane foam molded product and the cost accordingly increase.

The blending amount of the binder necessary and sufficient for coating particles to be adhered is desirably 2% by mass or more and 4% by mass or less when the total mass of the powders to be adhered is assumed to be 100% by mass. When the blending amount of the binder is less than 2% by mass, the binder does not spread all over the surfaces of the thermally conductive particles, the magnetic particles, and the insulating inorganic particles, so that the adhesion property of these particles lowers. On the other hand, when the blending amount of the binder is more than 4% by mass, the amount of the binder is excessive, so the composite particles may disadvantageously aggregate. The binder may be either a solid or a liquid. When a water-soluble powder is used as the binder, it is preferred that the binder and the powders of other raw materials are stirred beforehand and then, water is added to the resultant mixture. By this operation, the aggregation of the particles can be suppressed.

When the insulating inorganic particles are located in the outermost layers of the composite particles, it is satisfactory that first, the magnetic particles are adhered to the thermally conductive particles and then, the insulating inorganic particles are adhered. In this case, it is preferred that the present process is configured to include a first stirring process of stirring a first powder raw material containing the powder of the thermally conductive particles, the powder of the magnetic particles, and the binder, and a second stirring process of adding the powder of the insulating inorganic particles and the binder to the resultant stirred mixture and further stirring the resultant mixture.

(2) Raw Material Mixing Process

The present process is a process for mixing the powder of the composite particles produced in the previous process, the foamable urethane resin raw material, and if necessary, the powder of the insulating inorganic particles to prepare a mixed raw material.

The foamable urethane resin raw material may be prepared from a publicly known raw material such as polyol and polyisocyanate. Polyol may be accordingly selected from multivalent hydroxy compounds, polyetherpolyols, polyesterpolyols, polymer polyols, polyether polyamines, polyester polyamines alkylenepolyols, urea-dispersed polyols, melamine-modified polyols, polycarbonatepolyols, acrylpolyols, polybutadienepolyols, phenol-modified polyols, and the like. Polyisocyanate may be accordingly selected from tolylene diisocyanate, phenylene diisocyanate, xylylene diisocyanate, diphenylmethane diisocyanate, triphenylmethane triisocyanate, polymethylene polyphenyl isocyanate, naphthalene diisocyanate, and derivatives thereof (for example, prepolymers, modified polyisocyanates, and the like obtained by a reaction with the polyols).

In the foamable urethane resin raw material, a catalyst, a foaming agent, a foam stabilizer, a plasticizer, a crosslinker, a flame retardant, an anti-static, agent, a viscosity reducing agent, a stabilizer, a filler, a colorant, and the like may also be accordingly blended. Examples of the catalyst include: an amine-based catalyst such as tetraethylene diamine, triethylene diamine, and dimethylethanolamine; and an organometallic catalyst such as tin laurate and tin octanoate. As the foaming agent, water is preferred. Examples of the foaming agent include besides water, methylene chloride, fluorocarbons, and a $CO_2$ gas. As the foam stabilizer, a silicone-based foam stabilizer is preferred. As the crosslinker, triethanolamine, diethanolamine, and the like are preferred.

As described above, in the urethane foam molded product of the present invention, the insulating inorganic particles may also be dispersed in the base material, besides the composite particles. When a urethane foam molded product in this form is produced, the powder of the composite particles and the insulating inorganic particles may be mixed with the foamable urethane resin raw material. In this case, also in the description below of the production method, the insulating inorganic, particles may be handled in the same manner as in the case of the composite particles.

The mixed raw material can be produced, for example, by mechanically stirring the composite particles and the foamable urethane resin raw material using a propeller or the like.

The mixed raw material may also be produced by adding the composite particles to at least one of two components (polyol raw material and polyisocyanate raw material) of the foamable urethane resin raw material and preparing two types of raw materials and mixing the two raw materials. In the latter case, for example, the present process can be configured by a raw material preparing process for preparing a polyol raw material containing polyol, a catalyst, and a foaming agent, and a polyisocyanate raw material containing polyisocyanate as components of the foamable urethane resin raw material, and blending the composite particles in at least one of the polyol raw material and the polyisocyanate raw material; and a mixing process for supplying the polyol raw material and the polyisocyanate raw material individually to a mixing head through pressure supplies and mixing the two raw materials in the mixing head and preparing the mixed raw material.

According to the present constitution, adopted can be a collision stirring method for mixing the polyol raw material with the polyisocyanate raw material by injecting them individually at high pressure in the mixing head to collide the raw materials with each other. By the collision stirring method, a continuous production is possible. Therefore, the collision stirring method is suitable for mass production. By the collision stirring method, in comparison with a mechanically stirring method, a process of washing a vessel, which is necessary every time the mixing is performed in the mechanically stirring method, becomes unnecessary and the yield increases. Therefore, the production cost can be reduced.

In the collision stirring method, the polyol raw material in which the composite particles are blended beforehand and the polyisocyanate raw material are individually injected at high pressure through injection holes provided in the mixing head of a high pressure foaming apparatus to collide the raw materials with each other. If the size of the composite particles is larger than a hole diameter of the injection hole, the injection holes are prone to be damaged due to the contact of the composite particles with the injection holes, which leads to lowering of durability of the mixing head. Further, the composite particles of a larger size are more likely to precipitate in the polyol raw material and the like. Therefore, homogeneous mixing is difficult. Accordingly, in the case of adopting the collision stirring method, the maximum length of the composite particles is desirably smaller than the hole diameter of the injection holes through which the polyol raw material and the polyisocyanate raw material are injected. Herewith, a burden to the mixing head can be reduced and the lifetime of the high pressure foaming apparatus can be increased. The precipitation of the composite particles can be suppressed and elevation of the viscosity of the polyol raw material and the like can be reduced. For example, the composite particles desirably have a particle diameter (the maximum length) of 500 μm or less.

As described above, for obtaining a urethane foam molded product having desired physical properties without inhibiting the foaming reaction, the blending amount of the composite particles is preferably 20% by volume or less when the volume of the urethane foam molded product is assumed to be 100% by volume. The blending amount thereof is more preferably 15% by volume or less. On the other hand, for obtaining an effect of enhancing thermal conductivity the blending amount of the composite particles is preferably 3% by volume or more and more preferably 10% by volume or more.

(3) Foam Molding Process

The present process is a process for injecting the mixed raw material obtained in the previous process into a cavity of the foaming mold and perform foam molding with applying a magnetic field to the mixed raw material so that the magnetic flux density in the cavity is substantially homogeneous.

The magnetic field may be formed in a direction in which the composite particles are oriented. For example, when the composite particles are oriented linearly, the magnetic lines of force in the cavity of the foaming mold are desirably formed from one end toward the other end of the cavity so as to be substantially parallel to each other. For forming such a magnetic field, for example, magnets may be arranged in the vicinities of surfaces of one end and the other end of the foaming mold so as to sandwich the foaming mold. For the magnets, a permanent magnet or an electromagnet may be used. When the electromagnet is used, on/off of the formation of a magnet field can be instantaneously switched, so that the strength of the magnetic field can be easily controlled. Therefore, the foam molding can be easily controlled.

The magnetic lines of force constituting the magnetic field desirably form a closed loop. Herewith, a leakage of the magnetic lines of force can be suppressed and a stable magnetic field can be formed in the cavity. For forming the magnetic field inside the foaming mold using magnets arranged outside the foaming mold, a foaming mold of a material having a low magnetic permeability that is, a foaming mold of a non-magnetic material may be used. For example, a foaming mold made of aluminum or an aluminum alloy which is usually used for foam molding of polyurethane is acceptable. In this case, the magnetic field and the magnetic lines of force generated from a magnetic force source such as an electromagnet are not likely to be affected by the foaming mold, so that the magnetic field can be easily controlled. However, a foaming mold made of a magnetic material may also be used as appropriate depending on the state of a necessary magnetic field and necessary magnetic lines of force.

In the present process, the magnetic field is formed so that the magnetic flux density in the cavity is substantially homogeneous. For example, a variation of the magnetic flux density in the cavity is preferably within ±10%, more preferably within ±5%, and further preferably within ±3%. By forming a homogeneous magnetic field in the cavity of the foaming mold, an uneven distribution of the composite particles can be suppressed and a desired orientation state can be obtained. The foam molding is performed preferably in a magnetic flux density of 150 mT or more and 350 mT or less. Herewith, the composite particles in the mixed raw material can be reliably oriented.

The magnetic field is desirably applied while the viscosity of the foamable urethane resin raw material is relatively low. If the magnetic field is applied after the foamable urethane resin raw material is thickened and the foam molding has been completed to a certain degree, the composite particles are less likely to be oriented, so it is difficult to obtain a desired thermal conductivity. It is not necessary to apply the magnetic field throughout the entire foam molding process.

In the present process, after the completion of the foam molding, the mold is removed and the urethane foam molded product of the present invention is obtained. At this time, depending on the method of the foam molding, a surface layer is formed on at least one of one end and the other end of the urethane foam molded product. The surface layer may be removed depending on an application (needless to say, may be left unremoved).

EXAMPLE

Next, the present invention will be more specifically described using examples.

<Production of Composite Particles>

Example

Two types of composite particles containing different insulating inorganic particles were produced. First, an expanded graphite powder ("SYZR502FP" purchased from Sanyo Trading Co., Ltd.; thermal conductivity: 250 W/m·K, average particle diameter: 300 μm) serving as the thermally conductive particles, a stainless steel powder (SUS410L, flake shape, average particle diameter: 20 μm) serving as the magnetic particles, an alumina powder ("AL-43KT" manufactured by Showa Denko K.K.; median diameter: 4.6 μm) serving as the insulating inorganic particles, and hydroxypropylmethylcellulose (HPMC, "TC-5" manufactured by Shin-Etsu Chemical Co., Ltd.) serving as the binder were prepared. The above flake-shaped stainless steel powder was produced by subjecting a spherical stainless steel powder ("DAP410L" manufactured by Daido Steel Co., Ltd.; average particle diameter: 10 μm) to a flattening treatment. That is, a planetary ball mill ("Planet-M" manufactured by Gokin Planetaring Inc.) was filled with the spherical stainless steel powder and a zirconia ball having a diameter of 5 mm, and processing was performed at a rotation speed of 300 rpm for 1 hour.

Next, the expanded graphite powder, the stainless steel powder, and HPMC were charged into a vessel of a high speed stirring-type mixing granulator ("NMG-1L" manufactured by Nara Machinery Co., Ltd.) and were mixed for 3 minutes. Then, water was added and the resultant mixture was mixed further for 10 minutes (first stirring process). Next, the alumina powder and HPMC were added and the resultant mixture was mixed for 3 minutes. Then, water was added and the resultant mixture was further mixed for 10 minutes (second stirring process). The obtained powder was dried and was sieved out using a sieve having an aperture of 500 μm. Particles having the maximum length of 500 μm or less were recovered. Thus, the powder of the composite particles of Example 1 was produced.

In the same manner as in Example 1, except that the insulating inorganic particles were changed to an aluminum hydroxide powder ("HIGILITE (registered trade mark) H32" manufactured by Showa Denko K.K.; median diameter: 8 μm), the powder of the composite particles of Example 2 was produced.

The blending amount of the raw materials is shown in Table 1 below. Note that, for HPMC, 6 g thereof was blended in each of the first stirring process and the second stirring process. In the composite particles of Examples 1 and 2, the volume ratio between the expanded graphite particles and the stainless steel particles was about 6:4. In the composite particles of Example 1, the volume ratio between the expanded graphite particles and the alumina particles was about 4:6. In the composite particles of Example 2, the volume ratio between the expanded graphite particles and the aluminum hydroxide particles was about 3.5:6.5.

Comparative Examples

By varying the blending amount of an aluminum hydroxide powder serving as the insulating inorganic particles, three types of composite particles were produced. In Comparative Example 3, the aluminum hydroxide powder was not blended and only the expanded graphite particles and the stainless steel particles were compounded (see Table 1). In the composite particles of Comparative Example 1, the volume ratio between the expanded graphite particles and the aluminum hydroxide particles was about 2.5:7.5. In the composite particles of Comparative Example 2, the volume ratio between the expanded graphite particles and the aluminum hydroxide particles was about 5:5.

[SEM Observation Of Composite Particles]

Figure 2:
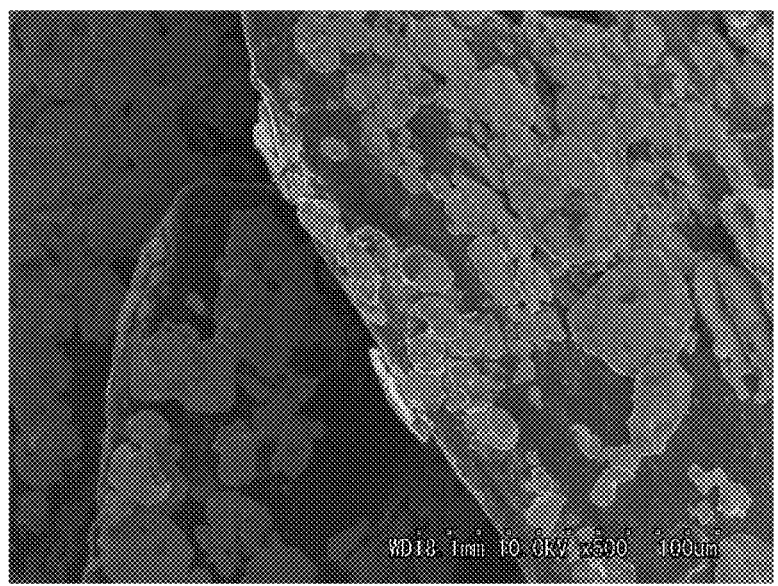
FIG. 2 is an SEM photograph of composite particles of Comparative Example 3 (magnification: 500 times).

The produced powder of the composite particles was observed using a warming electron microscope (SEM). FIG. 1 shows an SEM photograph of the composite particle of Example 2 (magnification: 500 times). FIG. 2 shows an SEM photograph of the composite particles of Comparative Example 3 (magnification: 500 times). As shown in FIG. 2, it was confirmed that in the composite particles of Comparative Example 3, the stainless steel particles are adhered to the surfaces of the expanded graphite particles. On the other hand, as shown in FIG. 1, it was confirmed that in the composite particles of Example 2, the stainless steel particles are adhered to the surfaces of the expanded graphite particles and the aluminum hydroxide particles are adhered onto the stainless steel particles. That is, in the composite particles of Example 2, the aluminum hydroxide particles are located in the outermost surface.

<Production of Urethane Foam Molded Product>

Using the produced composite particles, the urethane foam molded product was produced. First, the foamable urethane resin raw material was prepared as follows. By mixing 100 parts by mass of polyetherpolyol ("S-0248" manufactured by Sumika Bayer Urethane Co., Ltd.; average molecular weight: 6,000, number of functional groups: 3, OH value: 28 mgKOH/g) as the polyol component, two parts by mass of diethylene glycol (manufactured by Mitsubishi Chemical Corporation) as the crosslinker, two parts by mass of water as the foaming agent, one part by mass of a tetraethylenediamine-based catalyst ("KAOLIZER (registered trade mark) No. 31" manufactured by Kao Corporation), and 0.5 parts by mass of a silicone-based foam stabilizer ("SZ-1313" manufactured by Dow Corning Toray Co., Ltd.), the polyol raw material was prepared. To the prepared polyol raw material, diphenylmethane diisocyanate (MDI) ("NE1320B" manufactured by BASF INOAC Polyurethane Ltd.; NOC=44.8% by weight) as the polyisocyanate component was added and the resultant mixture was mixed, whereby the foamable urethane resin raw material was prepared. Here, the blending ratio (PO:ISO) between the polyol component and the polyisocyanate component was set to PO:ISO=78.5:21.5 assuming that the total mass of the both was 100%.

Next, the produced composite particles were blended with the prepared foamable urethane resin raw material so that five types of mixed raw materials were prepared. Separately, the composite particles of Example 2 and an aluminum hydroxide powder (the same as described above) were blended with the prepared foamable urethane resin raw material so that a mixed raw material was prepared. The blending amount of the aluminum hydroxide powder was 8% by volume when the volume of the produced urethane foam molded product was assumed to be 100% by volume. In each mixed raw material, the blending amount of the composite particles was 19% by volume when the volume of the produced urethane foam molded product was assumed to be 100% by volume.

Figure 3:
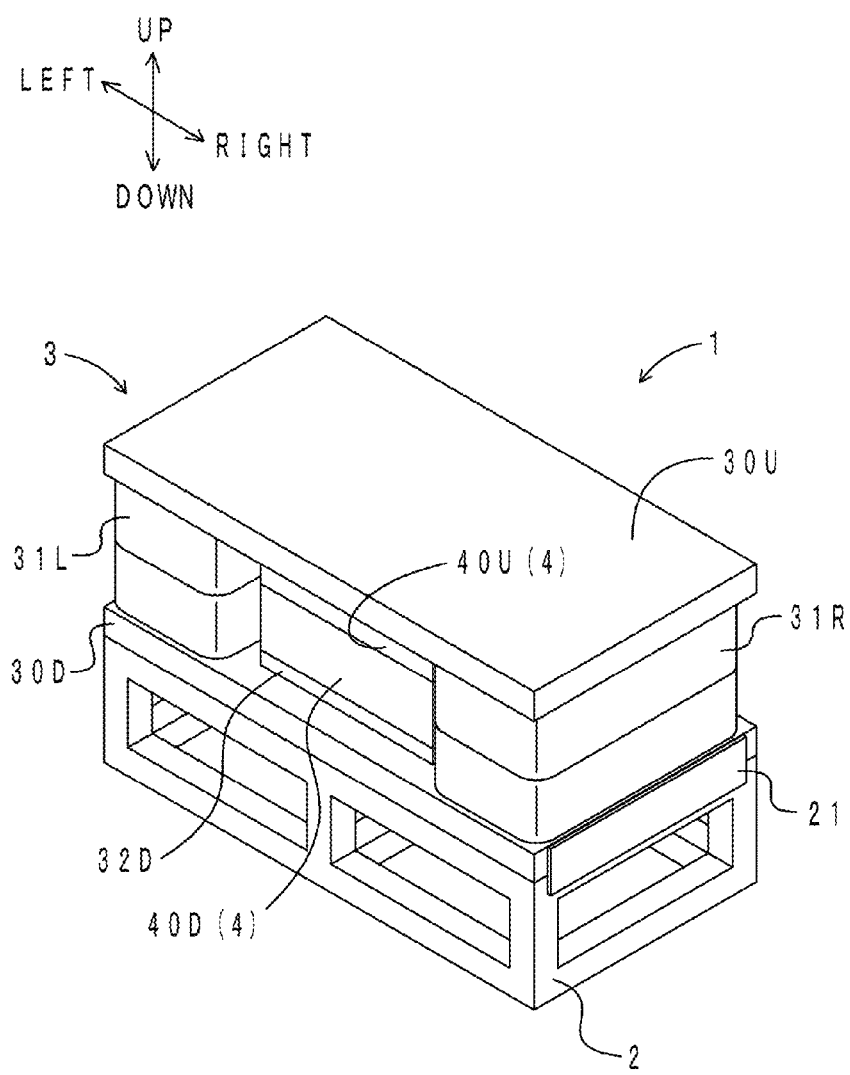
FIG. 3 is a perspective view of a magnetic-induced foam molding apparatus used for the production of the urethane foam molded product.

Next, each mixed raw material was injected into an aluminum-made foaming mold (see FIG. 3 and FIG. 4 described below; the cavity is a rectangular parallelepiped with 130 mm (length)×130 mm (width)×20 mm (thickness).) and the forming mold was sealed. Then, the foaming mold was set in a magnetic-induced foam molding apparatus and the foam molding was performed. FIG. 3 shows a perspective view of a magnetic-induced foam molding apparatus. FIG. 4 shows a sectional view of the same apparatus. In FIG. 4, hatchings of the yoke parts and the core parts are omitted for convenience of description. As shown in FIG. 3 and FIG. 4, a magnetic-induced foam molding apparatus 1 includes a frame 2, an electromagnet part 3, and a foaming mold 4.

The electromagnet part 3 is placed on the top face of the frame 2. The electromagnet part 3 and the frame 2 are fixed to each other by screwing a bracket 21 to both the electromagnet part 3 and the frame 2. The electromagnet part 3 includes yoke parts 30U, 30D, coil parts 31L, 31R, and pole pieces 32U, 32D.

The yoke part 30U is made of iron and has a plate shape. The yoke part 30D similarly is made of iron and has a plate shape. The yoke parts 30U, 30D are arranged facing each other in the up-down direction.

The coil part 31L is interposed between the yoke parts 30U, 30D. The coil part 31L is arranged on the left of the foaming mold 4. Two coil parts 31L are arranged so as to overlap in the up-down direction. The coil part 31L includes a core part 310L and a conductor 311L. The core part 310L is made of iron and has a columnar shape extending in the up-down direction. The conductor 311L is wound on the circumference surface of the core part 310L. The conductor 311L is connected to a power source (not shown).

The coil part 31R is interposed between the yoke parts 30U, 30D. The coil part 31R is arranged on the right of the foaming mold 4. Two coil parts 31R are arranged so as to overlap in the up-down direction. The coil part 31R has the same configuration as that of the coil part 31L. That is, the coil part 31R includes a core part 310R and a conductor 311R. The conductor 311R is wound on the circumference surface of the core part 310R. The conductor 311R is connected to a power source (not shown).

The pole piece 32U is made of iron and has a plate shape. The pole piece 32U is arranged at the center of the bottom face of the yoke part 30U. The pole piece 32U is interposed between the yoke part 30U and the foaming mold 4. The pole piece 32D is made of iron and has a plate shape. The pole piece 32D is arranged at the center of the top face of the yoke part 30D. The pole piece 32D is interposed between the yoke part 30D and the foaming mold 4.

The foaming mold 4 is arranged between the coil part 31L and the coil part 31R. The foaming mold 4 includes an upper mold 40U and a lower mold 40D. The upper mold 40U has a square plate shape. The lower mold 40D has a rectangular parallelepiped shape. In the top face of the lower mold 40D, a recessed portion is formed. The recessed portion has a rectangular parallelepiped shape opening upward. By joining the upper mold 40U and the lower mold 40D, a cavity 41 in a rectangular parallelepiped shape is defined. The cavity 41 is filled with the mixed raw material as described above.

When both the power source connected to the conductor 311L and the power source connected to the conductor 311R are switched to ON, the upper and lower ends of the core part 310L of the coil part 31L are magnetized to become north and south poles, respectively. Therefore, magnetic lines of force L (shown by the dotted lines in FIG. 4) heading from bottom to top is generated in the core part 310L. In the same manner, the upper and lower ends of the core part 310R of the coil part 31R are magnetized to become north and south poles, respectively. Therefore, magnetic lines of force L heading from bottom to top are generated, in the core part 310R.

The magnetic lines of force L radiated from the upper end of the core part 310L of the coil part 31L pass through the yoke part 30U and the pole piece 32U and flow into the cavity 41 of the foaming mold 4. Then, the magnetic lines of force L pass through the pole piece 32D and the yoke part 30D and flow into the lower end of the core part 310L. In the same manner, the magnetic lines of force L radiated from the upper end of the core part 310R of the coil part 31R pass through the yoke part 30U and the pole piece 32U and flow into the cavity 41 of the foaming mold 4. Then, the magnetic lines of force L pass through the pole piece 32D and the yoke part 30D and flow into the lower end of the core part 310R. In this way, the magnetic lines of force L configure a closed loop, so that a leakage of the magnetic lines of force L is suppressed. In the cavity 41 of the foaming mold 4, a homogeneous magnetic field is formed by magnetic lines of force L heading from top to bottom and substantially parallel to each other. Specifically, the magnetic flux density in the cavity 41 was about 300 mT and a variation in the magnetic flux density in the cavity 41 was within ±3%.

The foam molding was performed with applying a magnetic field for first approximately 2 minutes, and not applying a magnetic field for the next approximately 5 minutes. After the completion of the foam molding, the mold was removed and the urethane foam molded product was obtained. The obtained urethane foam molded products were numbered corresponding to the numbers of the composite particles. A urethane foam molded product containing the aluminum hydroxide powder, besides the composite particles, was named the urethane foam molded product of Example 3. When a cross section of each urethane foam molded product was visually observed, the composite particles were oriented in a mutually connected state. In the urethane foam molded product of Example 3, the aluminum hydroxide particles were dispersed in a polyurethane foam (base material).

<Evaluation Method>

For the produced urethane foam molded products, thermal conductivity, electric insulation, and flame retardance were evaluated. Hereinafter, an evaluation method of each property is described.

[Thermal Conductivity]

The thermal conductivity of the urethane foam molded product was measured using "HC-110" manufactured by EKO Instruments Co., Ltd. according to the heat flow meter method of JIS A1412-2 (1999).

[Electric Insulation]

The volume resistivity of the urethane foam molded product was measured according to the parallel terminal electrode method of JIS K6271 (2008). The applying voltage was set to 1 kV.

[Flame Retardance]

The flame retardance of the urethane foam molded product was evaluated based on the combustion test standard (UL94) established by Underwriters Laboratories, Inc. of USA. Then, when flame retardance of a urethane foam molded product satisfied the criterion of "V-0", the urethane foam molded product was evaluated as satisfactory (indicated with "○" in Table 1).

<Evaluation Result>

In Table 1, the evaluation result of each urethane foam molded product is shown together with the blending amount of the raw materials used for the production of the composite particles.

TABLE 1

| Raw materials for composite particles (unit: g) | | Example 1 | Example 2 | Example 3 | Comparative Example 1 | Comparative Example 2 | Comparative Example 3 |
|---|---|---|---|---|---|---|---|
| Thermally conductive particles | Expanded graphite powder | 100 | 100 | 100 | 100 | 100 | 100 |

TABLE 1-continued

| Raw materials for composite particles (unit: g) | | Example 1 | Example 2 | Example 3 | Comparative Example 1 | Comparative Example 2 | Comparative Example 3 |
|---|---|---|---|---|---|---|---|
| Magnetic particles | Stainless steel powder | 150 | 150 | 150 | 150 | 150 | 150 |
| Insulating inorganic particles | Alumina powder | 200 | — | — | — | — | — |
| | Aluminum hydroxide powder | — | 200 | 200 | 300 | 125 | — |
| Binder | Hydroxypropylmethylcellulose | 12 | 12 | 12 | 12 | 12 | 6 |
| Blending amount of composite particles [% by volume] | | 19 | 19 | 19 | 19 | 19 | 19 |
| Blending amount of aluminum hydroxide powder (other than in composite particles) [% by volume] | | — | — | 8 | — | — | — |
| Evaluation | Thermal conductivity [W/m·K] | 1.20 | 1.14 | 1.45 | 0.73 | 1.25 | 1.34 |
| | Volume resistivity during applying 1 kV [Ω·cm] | $6.7 \times 10^8$ | $7.8 \times 10^8$ | $2.5 \times 10^9$ | $1.4 \times 10^9$ | $6.9 \times 10^6$ | $10^5$ or less |
| | Flame retardance (UL94 V-0) | ○ | ○ | ○ | ○ | ○ | ○ |

As shown in Table 1, the urethane foam molded products of Examples 1 to 3 satisfied both a thermal conductivity of 1 W/m·K or more and a volume resistivity of $10^8$ Ω·cm or more. Particularly, in the urethane foam molded product of Example 3 produced by dispersing the insulating inorganic particles besides the composite particles, both the thermal conductivity and the volume resistivity were larger. Thus, it was confirmed that the urethane foam molded products of Examples 1 to 3 had high thermal conductivity and electric insulation. On the other hand, in the urethane foam molded product of Comparative Example 3 in which composite particles containing no insulating inorganic particles were blended, thermal conductivity was high, but electric insulation could not be achieved.

The thermal conductivity and the volume resistivity of the urethane foam molded product varied depending on the blending amount of the insulating inorganic particles in the production of the composite particles. For example, in the urethane foam molded product of Comparative Example 1 in which a large amount of insulating inorganic particles was blended, the volume resistivity was high, but the thermal conductivity was low. As the blending amount of the insulating inorganic particles increases, the amount of the adhered insulating inorganic particles increases, and the distance between the adjacent thermally conductive particles accordingly increases. Herewith, although electric resistance between the composite particles increases, thermal conductivity therebetween decreases. Thus, electric insulation of the urethane foam molded product could be achieved; however, desired thermal conductivity could not be obtained. On the other hand, in the urethane foam molded product of Comparative Example 2 in which the blending amount of the insulating inorganic particles was smaller, the thermal conductivity was high, but the volume resistivity was low. As the blending amount of the insulating inorganic particles decreases, the amount of the adhered insulating inorganic particles decreases. Thus, the thermal conductivity is less likely to lower. However, the cutting of conduction between the composite particles becomes insufficient. Thus, although the thermal conductivity of the urethane foam molded product was high, electric insulation thereof could not be achieved.

For flame retardance, every urethane foam molded product cleared the V-0 standard of UL94. From this result, it was confirmed that even when the magnetic particles are blended in the urethane foam molded product, high flame retardance can be achieved by using the expanded graphite particles as the thermally conductive particles.

INDUSTRIAL APPLICABILITY

The urethane foam molded product of the present invention can be used in wide variety of fields, such as the automotive, electronic, and construction fields. The urethane foam molded product of the present invention can also be used in an application requiring high flame retardance besides heat dissipation. The urethane foam molded product of the present invention is suitable for, for example, sound absorbing tires for reducing noise caused by unevenness of road surfaces, engine covers or side covers placed in vehicle engine compartments for reducing engine noise, material for absorbing sound of the motors of OA (Office Automation) equipment or of household appliances, a heat radiating sound absorbing material for electronic equipment such as a personal computer, sound absorbing material for inner and outer walls of houses, vibration absorbing material used in the power conditioner reactors of solar power generation systems, and the like.

The invention claimed is:

1. A urethane foam molded product, characterized by comprising:
    a base material made of a polyurethane foam; and
    composite particles that are blended in the base material and oriented in a mutually connected state, wherein
    each of the composite particles includes a thermally conductive particle made of a non-magnetic body, and a magnetic particle and an insulating inorganic particle that are adhered to a surface of the thermally conductive particle through a binder,
    the insulating inorganic particle is one or more selected from aluminum hydroxide, aluminum oxide, magnesium hydroxide, magnesium oxide, and talc.

2. The urethane foam molded product according to claim 1, wherein the insulating inorganic particle is located in outermost layers of the composite particles.

3. The urethane foam molded product according to claim 1, wherein the insulating inorganic particle has a thermal conductivity of 5 W/m·K or more.

4. The urethane foam molded product according to claim 1, wherein the insulating inorganic particle has a particle diameter of 1/100 or more and 1/10 or less of a particle diameter of the thermally conductive particle.

5. The urethane foam molded product according to claim 1, wherein the volume ratio between the thermally conductive particle and the insulating inorganic particle in the composite particle is 4:6 to 3:7.

6. The urethane foam molded product according to claim 1, wherein the thermally conductive particle is at least one of a natural graphite particle and an expanded graphite particle.

7. The urethane foam molded product according to claim 1, wherein the binder is one or more selected from methylcellulose, carboxymethylcellulose, hydroxypropylmethylcellulose, and polyvinyl alcohol.

8. The urethane foam molded product according to claim 1, wherein a thermal conductivity is 1 W/m·K or more and a volume resistivity during application of a voltage of 1 kV is $10^8$ Ω·cm or more.

9. The urethane foam molded product according to claim 1, further comprising the insulating inorganic particle dispersed in the base material.

10. The urethane foam molded product according to claim 1, wherein the composite particles are produced by a stirring granulation method.

11. A method for producing the urethane foam molded product as claimed in claim 10, the method characterized by comprising:

a composite particle producing process of stirring a powder raw material containing a powder of the thermally conductive particle, a powder of the magnetic particle, a powder of the insulating inorganic particle, and the binder using a stirring granulator to produce a powder of the composite particles;

a raw material mixing process of mixing the produced powder of the composite particles, a foamable urethane resin raw material, and as necessary, the powder of the insulating inorganic particle to prepare a mixed raw material; and a foam molding process of injecting the mixed raw material into a cavity of a foaming mold and performing foam molding with applying a magnetic field to the mixed raw material so that the magnetic flux density in the cavity is substantially homogeneous.

12. The method for producing the urethane foam molded product according to claim 11, wherein the composite particle producing process includes a first stirring process of stirring a first powder raw material containing the powder of the thermally conductive particle, the powder of the magnetic particle, and the binder, and a second stirring process of adding the powder of the insulating inorganic particle and the binder to the resultant stirred material and further stirring the resultant mixture.

13. The method for producing the urethane foam molded product according to claim 11, wherein in the composite particle producing process, the blending amount of the powder of the insulating inorganic particle is 150 parts by mass or more and 250 parts by mass or less relative to 100 parts by mass of the powder of the thermally conductive particle.

\* \* \* \* \*